Feb. 18, 1930.   G. R. SHIRK ET AL   1,747,683
REFRIGERATING, HEATING, AND VENTILATING APPARATUS FOR CARS
Filed Nov. 19, 1925   5 Sheets-Sheet 1
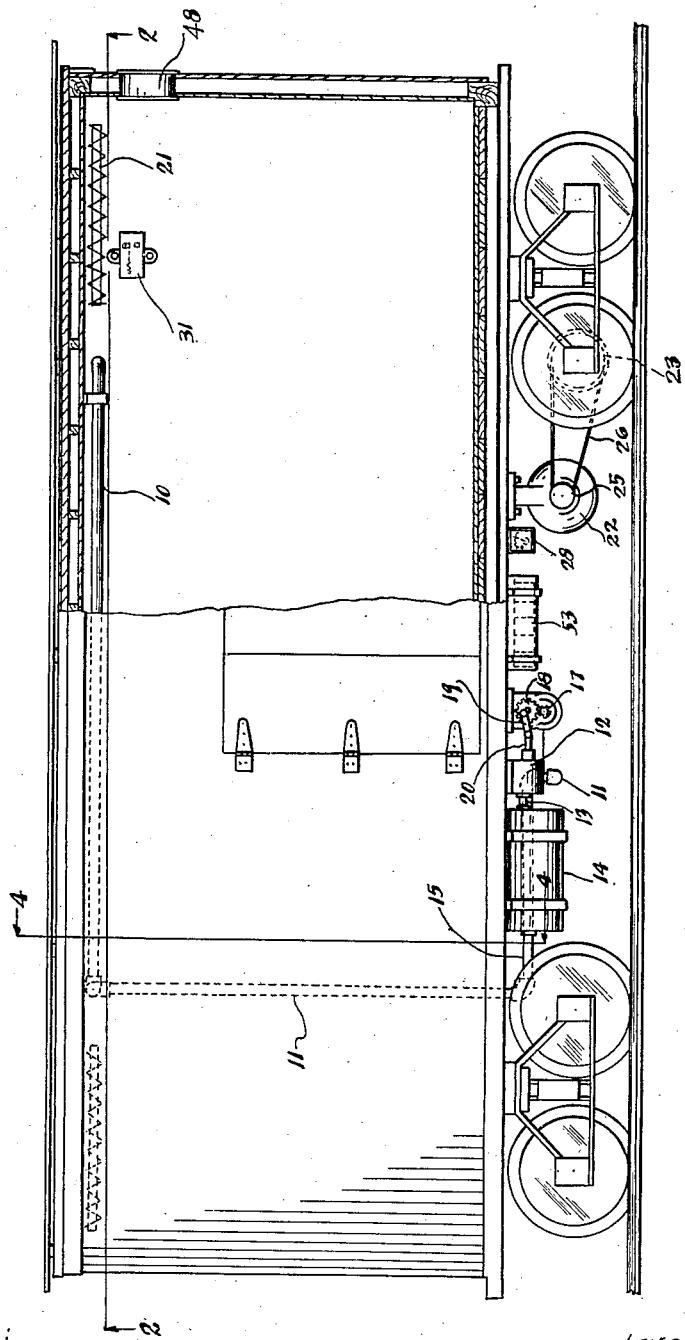

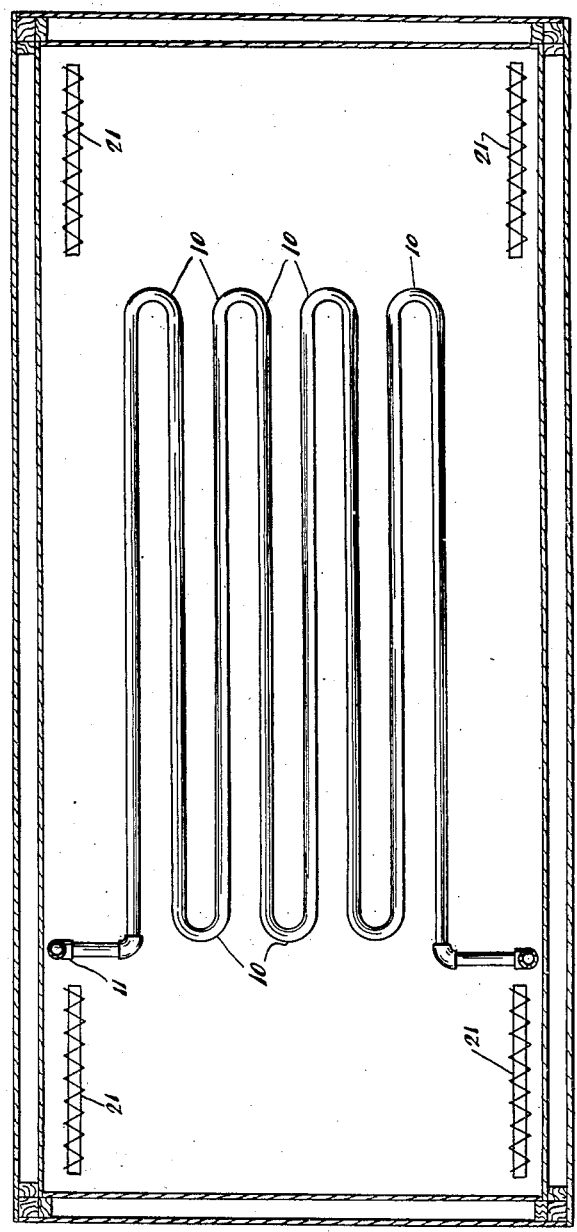

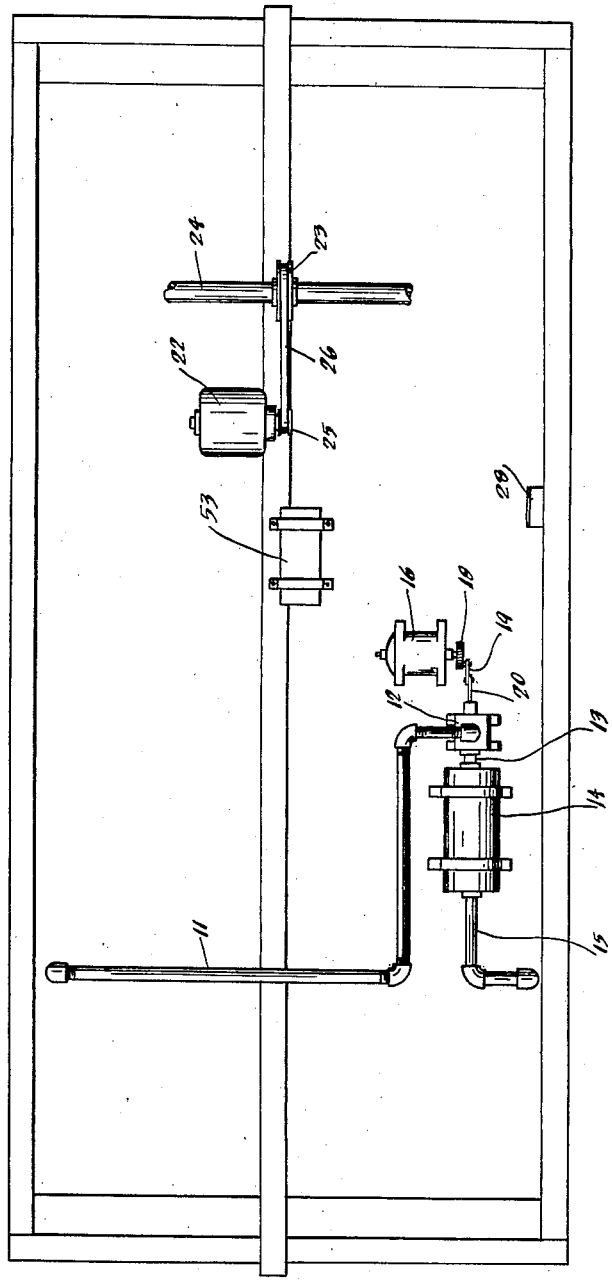

Feb. 18, 1930. G. R. SHIRK ET AL 1,747,683
REFRIGERATING, HEATING, AND VENTILATING APPARATUS FOR CARS
Filed Nov. 19, 1925 5 Sheets-Sheet 4
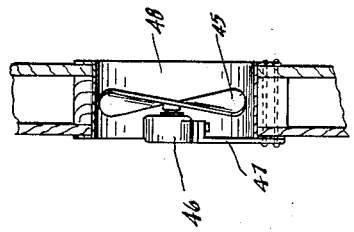
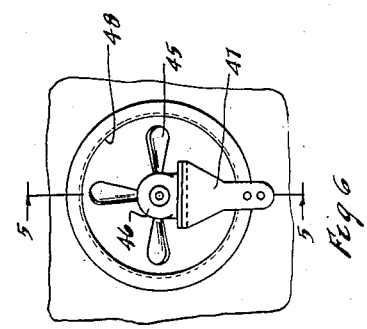
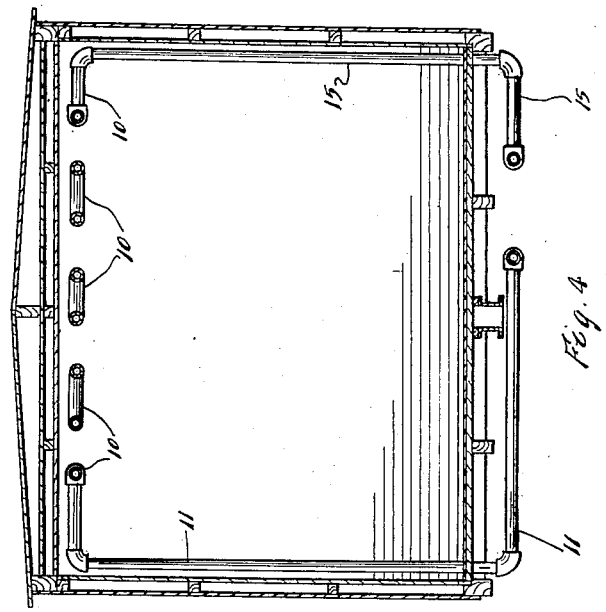
Witnesses
Inventors:
George R. Shirk
James V. Mohler
by Joshua H. Horn
Their Attorney

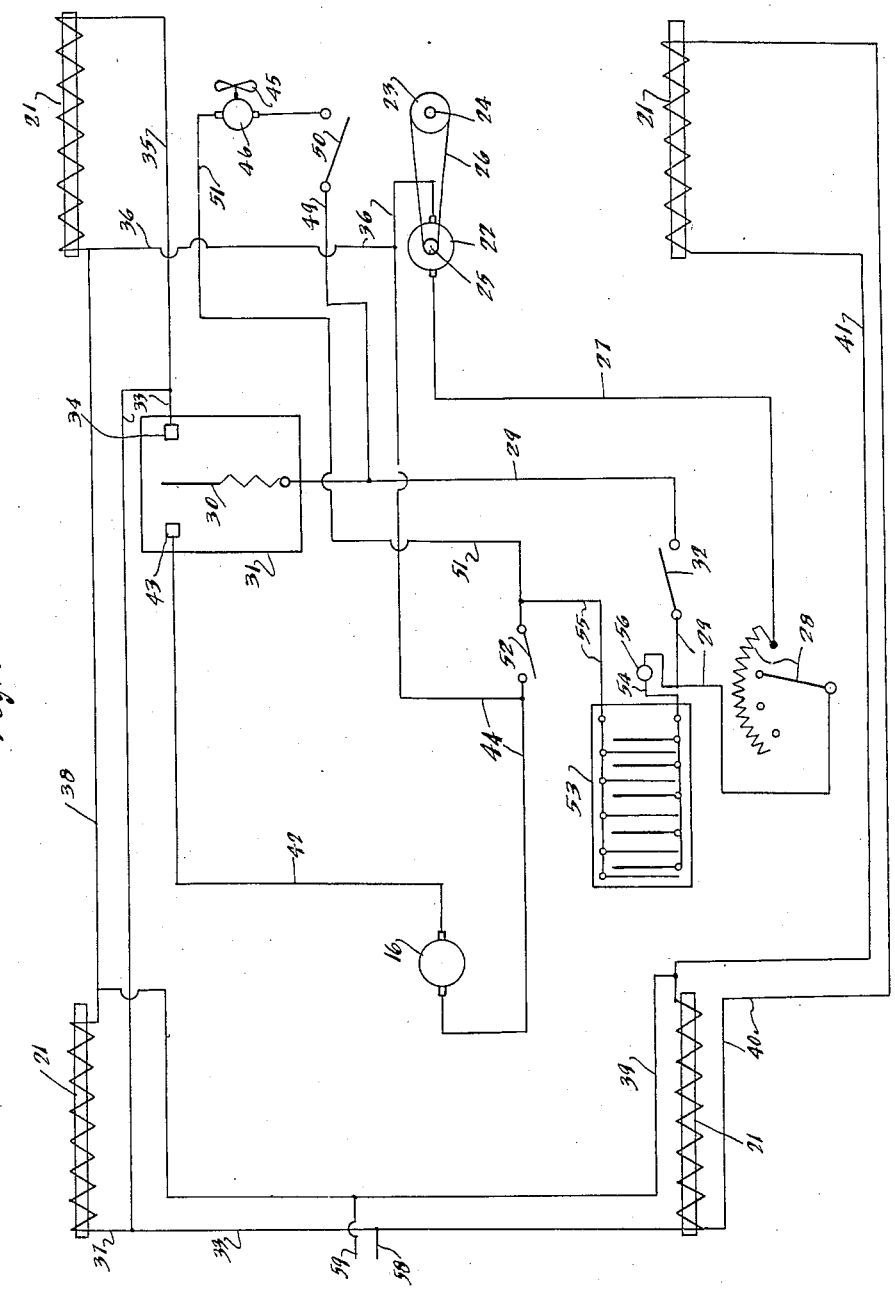

Patented Feb. 18, 1930

1,747,683

UNITED STATES PATENT OFFICE

GEORGE R. SHIRK AND JAMES V. MOHLER, OF OELWEIN, IOWA.

REFRIGERATING, HEATING, AND VENTILATING APPARATUS FOR CARS

Application filed November 19, 1925. Serial No. 70,112.

Our invention relates to a refrigerating, heating and ventilating apparatus for cars, especially for cars used in the transportation of perishable goods like foodstuffs; and the main object of the invention is to provide such an apparatus including means to heat the car in cold weather and means to cool the car in warm weather, and to provide thermostatic control means to operate either one of said heating and cooling means and thus automatically maintain the desired temperature in the car; another object is to provide means for ventilating the car; a further object is to provide electric means which are operated by the moving car and preferably by the car axle for supplying energy to the apparatus; another object is to provide a generator with electric means for supplying energy to the apparatus during movement of the car and to provide a battery connected with said generator and fed thereby for supplying energy to the apparatus when the car and generator are at rest.

Other objects will appear hereinafter.

The invention consists in the combinations and arrangements of parts hereinafter described and claimed.

The invention will be best understood by reference to the accompanying drawings forming a part of this specification, and in which, Fig. 1 is a side elevational view of a car, partly broken away, with our invention applied thereto;

Fig. 2 is an inverted horizontal sectional view taken on line 2—2 of Fig. 1;

Fig. 3 is an inverted plan view looking beneath said car;

Fig. 4 is a vertical cross sectional view taken on line 4—4 of Fig. 1;

Figs. 5 and 6 are enlarged detail views of the ventilating means for the car; and Fig. 7 is a diagrammatic view showing the electric wiring system.

The apparatus briefly comprises means for automatically maintaining the desired and suitable temperature in a car, and also means for ventilating the car; and the means for maintaining the suitable temperature including refrigerating means and also heating means provided in the car, and thermostatic means for automatically placing either the refrigerating means or the heating means in operation and placing the other one thereof out of operation.

The refrigerating or cooling means comprises a group of expansion or refrigerating coils 10, which are preferably placed adjacent the ceiling of the car, requiring but little space and being substantially out of the way. A pipe 11 leads from said coils down through the car and beneath the same and leads into the pump or compressor 12, which pumps the ammonia gas from coils 10 and pipe 11 and discharges it through pipe 13 into the connected condenser and receiver 14 wherein it is condensed to a liquid and passed out through the liquid line or pipe 15 back through the car and to the expansion or refrigerating coils 10. A motor 16 is mounted beneath the car for driving the pump, and preferably is provided with a small gear 17 on the motor shaft which drives a larger gear 18, thus reducing the speed, said gear 18 being connected through the crank shaft and a link 19 to the piston rod 20 of pump 12.

The heating means for the car preferably includes a group of electric heating members 21 mounted at appropriate places in the car and preferably under the ceiling thereof, as best indicated in Fig. 1 of the drawings. A generator 22 is preferably mounted beneath the car and is operated by the movement of the car, preferably by means of a pulley 23 on the car axle 24 which drives a pulley 25 on the generator by means of a belt 26. A conductor 27 leads from one pole of the generator to a control means or rheostat 28 wherefrom a conductor wire 29 leads to the movable contact finger 30 of the automatically operated thermostatic control means or switch 31, said switch or control means being a reliable mercury control or any suitable control means well adapted for the purpose. A control switch 32 is preferably also interposed in the conductor wire 29. A conductor wire 33 leads from one of the contacts 34 of the control switch 31, by means of a wire 35 through one of the heating means 21, wherefrom a wire 36 leads back to the second pole of the generator. The conductor wire 33 continues past the other heating means 21 in succession, and a wire 37 branches from wire 33 through the second heating means 21, and a wire 38 leads therefrom back to conductor 36 and thereby to the generator; similarly a wire 39 leads through the following heating coil 21 back to wire 38; while a wire 40 leads from wire 33 through another heating means or coil 21, and a wire 41 leads therefrom back to wire 39. This arrangement connects the heating coils in parallel, and when the temperature is sufficiently low to move the finger 30 of the thermostatic device 31 into engagement with contact 34, and when the car is in motion, the generator 22 will automatically heat the heating coils or means 21 to heat the car to the proper degree and when such degree of heat is exceeded, the thermostatic control switch 31 will automatically open and the heating elements will become inoperative.

The driving motor 16 of pump 12 is connected by means of a conductor wire 42 with the second contact point 43 of the thermostatic control switch 31, and a conductor wire 44 leads from said motor to the wire 36 which leads back to the generator 22. When the temperature in the car is sufficiently high to induce finger 30 of the thermostatic control switch 31 to engage contact 43, the motor 16 and the refrigerating means or cooling means will be set in operation to reduce the temperature of the car.

The ventilating means for the car includes a fan 45 mounted on the shaft of motor 46 which is supported, by the means of a bracket 47, in an exhaust port 48 provided at one end of the car. A conductor 49 leads from conductor 29 to one pole of motor 46, and preferably has a control switch 50 interposed therein; while a conductor 51 leads from the other pole of said motor 46 to conductor 44, and control switch 52 being preferably interposed in conductor 51, as indicated.

A battery 53 is provided and is connected by means of a wire 54 with conductor 29, and by means of a wire 55 to conductor 51 and through switch 52 also to conductor 44 connected with motor 16. An automatic cutout 56 is preferably also provided and interposed in wire 54, in order to automatically control the generator output or electric current to the storage battery.

The apparatus is arranged to independently equip each individual car, but connecting wires 58 and 59 are preferably also extended from the wiring system, as for instance from wires 33 and 39 respectively, and adapted to be connected with similar wires extending from the adjoining car, so that any or all the apparatus of the various cars can be operated by the current from the battery of any one car, whenever desired or found necessary.

It is apparent from the above disclosure that we have provided an apparatus for automatically and positively controlling and maintaining the proper temperature within a car, and that by the use of battery 53 along with the generator, the heating as well as the cooling system and also the ventilating fan may be operated and will be effective, through the energy of battery 53, whenever the car and generator are at rest, and furthermore that the output of the generator may be controlled through rheostat 28, and also that the current given to the batery 53 may be automatically controlled by means of the automatic cutout 56, and that the entire apparatus is arranged and placed out of the way so as to take up but the minimum of space within the car and thus leave the car space for the use of material to be transported thereby.

While we have illustrated and described the preferred form of construction for carrying our invention into effect, this is capable of variation and modification without departing from the spirit of the invention. We, therefore, do not wish to be limited to the precise details of construction set forth, but desire to avail ourselves of such variations and modifications as come within the scope of the appended claims.

Having described our invention, what we claim as new and desire to secure by Letters Patent is:

1. In combination with a refrigerating car having a cooling element containing a cooling medium; electrically operated means for circulating said cooling medium through said element; an electrical heating means; means for supplying current to said circulating means and to said heating means, and thermoresponsive means for automatically preventing the supplying of current to either said heating means or said circulating means while the other of said means is in operation.

2. In combination with a refrigerating car having a cooling element containing a cooling medium; electrically operated means for circulating said cooling medium through said element; an electrical heating means; a source of electromotive force for supplying current to said circulating means, and said heating means; an electric circuit for each of said means having a common portion; thermoresponsive means in said common portion for automatically closing said circuits, and adapted to open either of said circuits prior to the closing of the other.

3. In combination with a refrigerating car provided with a coil containing a cooling medium and pump means for the cooling medium; motor means for operating said pump means; electrical heating means within the car; means for supplying all necessary current for operating said motor means and electrical heating means; and means for automatically arresting the supply of current to either the motor means or the heating means while the other of them is operative, substantially as described.

4. In a railway car, the combination of an electrically operated refrigerating plant and electric heaters, a source of electric power, and means to switch the current from the source of power from the electrically operated refrigerating plant to the electric heaters or vice versa.

5. In a railway car, a generator for supplying electric current, an electrically operated refrigerating plant, electric heaters, and means to connect either the refrigerating plant or the heaters to current from the generator.

6. In a railway car as claimed in claim 5, having a storage battery in the car, and means to connect the storage battery to operate the refrigerating plant or the heaters.

7. In a railway car as claimed in claim 5, having a storage battery, means to connect the refrigerating plant or the heaters to the storage battery, and means to cut out the storage battery when the refrigerating plant or heaters are being operated from the generator.

8. In a railway car, a storage battery, a generator operated by the movement of the car, an electrically operated refrigerating plant, electric heaters, circuits from the battery and generator to the refrigerating plant and to the heaters, means to cut out the battery when the generator is operating the refrigerating plant or the heaters.

9. In a railway car as claimed in claim 8, having means to cut out the storage battery when the generator is actuating the refrigerating plant or the heaters, and means to utilize the surplus power generated to charge the battery.

In testimony whereof we have signed our names to this specification.

GEO. R. SHIRK.
JAMES V. MOHLER.